No. 642,905. Patented Feb. 6, 1900.
I. L. HAUSER.
RICE HULLER.
(Application filed Mar. 27, 1899.)
(No Model.)

Witnesses:
G. S. Noble.
F. L. Brown.

Inventor.
Isaiah L. Hauser,
By Charles Turner Brown,
Att'y.

THE NORRIS PETERS CO., PHOTO-LITHO., WASHINGTON, D. C.

1
UNITED STATES PATENT OFFICE.

ISAIAH L. HAUSER, OF CHICAGO, ILLINOIS.

RICE HULLER.

SPECIFICATION forming part of Letters Patent No. 642,905, dated February 6, 1900.

Application filed March 27, 1899. Serial No. 710,573. (No model.)

*To all whom it may concern:*

Be it known that I, ISAIAH L. HAUSER, a citizen of the United States, residing at Chicago, in the county of Cook and State of Illinois, have invented certain new and useful Improvements in Rice-Hullers, of which the following, when taken in connection with the drawings accompanying and forming a part hereof, is a full and complete description sufficient to enable those skilled in the art to understand, make, and use the same.

The object of this invention is to obtain a machine which shall be simple in construction, not liable to get out of order, not liable to break, having few parts or pieces, and not containing any small separable parts or pieces—that is, parts or pieces which can easily be removed from the machine—and to obtain a machine easily and accurately adjusted to correspond with the size of the rice or other like material which is being operated on thereby, as well as to correspond with the kind or character of the work to be done thereon, whether the same be simply hulling the rice or other material or cracking or breaking the same.

Figure 1:
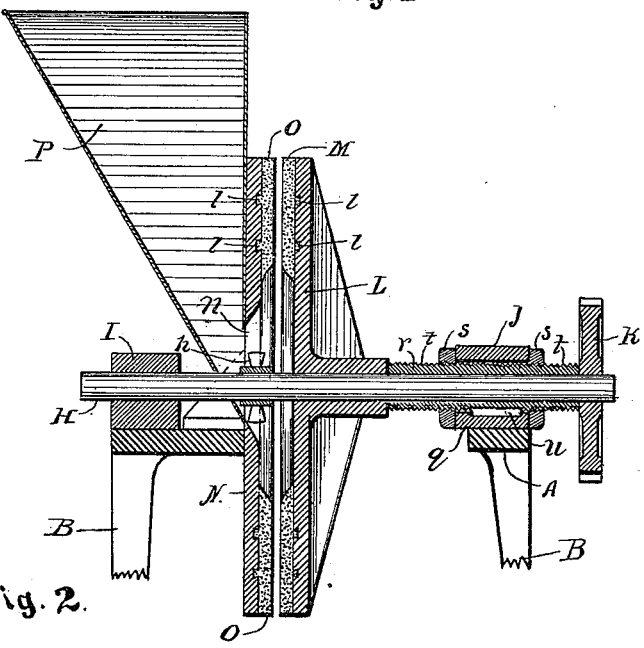
Figure 2:
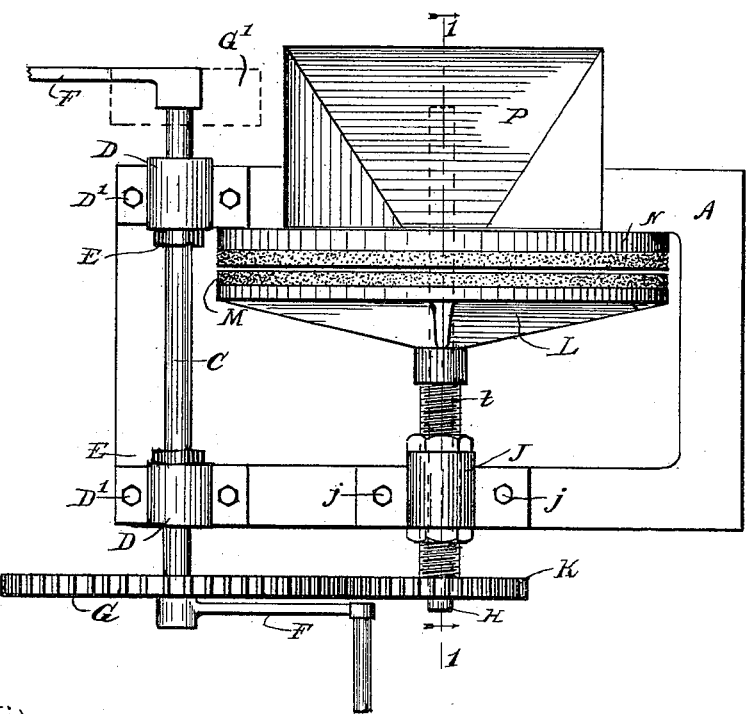

In the drawings referred to as forming a part of this specification, Figure 1 is a vertical sectional view of the operative parts of the machine on line 1 1 of Fig. 2, viewed in the direction indicated by the arrow; and Fig. 2, a top plan view of the machine.

A reference-letter applied to designate a given part is used to indicate such part throughout both figures wherever the same appears.

A is the frame of the machine, and B B are the legs or supports thereof.

C is a shaft rotatably mounted on the frame A in journal-bearings D D. The journal-bearings D D are respectively made in a single piece having a hole therethrough corresponding with the shaft C.

E E are collars adjustably secured to the shaft C to prevent longitudinal movement of such shaft in journal-bearings D D.

F F are cranks on the shaft C, and G is a gear-wheel on such shaft.

A driving-wheel, over which a belt may be extended, may be substituted for one of the cranks F F, if desired, and such a driving-wheel is indicated by the broken lines lettered G'.

It will be observed that by making the journal-bearings D D in one piece, as described, the loosening of the bolts D' D', by which such bearings are attached to frame A, would not permit the separation from the shaft C of such bearings so long as the cranks F F remained secured to the shaft, although such shaft, the cranks, collars, and journal-bearings could then be removed from the frame of the machine. By this construction the apparatus is especially fitted for use in localities where opportunities for obtaining or manufacturing such small parts are not present, as there is but little liability of separation or loss of any of such parts H is a shaft rotatably mounted in journal-bearings I J, such bearings being attached to frame A, as by the bolts *j j*. Bearing I is constructed substantially the same as are bearings D D, respectively.

*h* is a spirally-extending rib on shaft H, rotating therewith.

K is a gear-wheel rigidly attached on shaft H, intermeshing with gear-wheel G on shaft C. Rotation of shaft H is therefore produced by rotation of shaft C, and the relative speed of shafts C H is controlled by the relative size of the driving-gear G and the driven gear K. I have found in practice that the driving-gear G should be considerably larger than the driven gear K.

L is a metal wheel rigidly secured to shaft H to rotate therewith and provided with recesses *l l* on the front face thereof.

M is a cement or concrete grinding-disk secured on the front face of the wheel L, as by ribs thereto corresponding with and extending into the recesses *l l* on the front face of such wheel L.

N is a stationary frame, wheel, or disk, as preferred, rigidly mounted on frame A and having recesses *l l* on the front face thereof. Disk, frame, or wheel N is provided with the central opening *n* therethrough. Shaft H extends through the central opening *n* in the stationary frame, wheel, or disk N, as does also the spirally-extending rib *h* on shaft H.

O is a cement or concrete disk rigidly secured on the face of the frame, wheel, or disk N, the meeting faces thereof and the disk O having coresponding ribs and recesses in the same manner as have the meeting faces of the wheel L and disk M hereinbefore described.

P is the hopper of the machine.

In order to make the grinding-disks M and O adjustable relative to each other, I mount disk O immovably, as stated, and I construct the journal-bearing I so that the shaft H is longitudinally, as well as rotatably, movable therein and the journal-bearing J so that the longitudinal movement of the shaft H is determined and controlled thereby. For this purpose the journal-bearing J comprises the following-named parts: immovable part $q$, movable part $r$, and locking-nuts $s\ s$. The movable part $r$ is on the outside thereof provided with screw-threads $t\ t$, fitting into corresponding internal screw-threads in the nuts $s\ s$, respectively.

$u$ is a feather or spline engaging with immovable part $q$ and the movable part $r$ to permit longitudinal movement of the part $r$ and preventing rotation thereof. The shaft H is rotatable in the movable part $r$.

When constructed as above described, if the nut $s$ on one end of movable part $r$ be loosened and the nut on the other end of such movable part $r$ be correspondingly tightened, the longitudinally-movable part $r$ will thereby be moved longitudinally, and the ends of the movable part $r$ coming in contact, respectively, with the ends of the hubs of wheels K and L, which are respectively adjacent thereto, the shaft H and all the parts attached thereto, including wheels L and disk M, are moved longitudinally, thus moving disk M to or away from the disk O, thus obtaining adjustment of such disks relative to each other. A very close adjustment of grinding-disks M and O is thus obtainable, and the adjustment obtained is accurately maintained.

The operation of the machine is: Rice being put into the hopper P and the shaft C rotated, rotation of shaft H and grinding-disk M occurs. The contents of the hopper P are automatically fed through the opening $n$ in stationary frame, wheel, or disk N by the spirally-extending rib $h$ on the shaft H to between the grinding-disks M and O, and the rice extending between such grinding-disks is hulled with but little, if any, abrasion to the grains of rice.

By properly adjusting the grinding-disks M and O relative to each other in the manner hereinbefore described the grains of rice may be broken when desired.

It is evident that other material than rice may be put through this machine, as seeds of various kinds, either for the purpose of hulling the same or of breaking them up.

Having thus described the machine embodying my invention and the manner of operation thereof, what I claim as new, and desire to secure by Letters Patent, is—

The combination of a longitudinally and rotatably movable shaft, a grinding-disk immovably mounted on the frame on which the shaft is mounted, and having an axial aperture; means for rotating the shaft, and means for moving it longitudinally, the latter comprising a journal-bearing consisting of an immovable part secured to the frame, a longitudinally-movable and non-rotatable part in the immovable part and extending beyond the sides thereof, such movable part having external screw-threads and nuts on the screw-threads arranged to be turned against the sides of the immovable part, a disk rigidly secured on the rotatable shaft and means for depositing material between the disks through the axial aperture in the immovable disk; substantially as described.

ISAIAH L. HAUSER.

In presence of—
 CHARLES TURNER BROWN,
 FLORA L. BROWN.